Oct. 1, 1957  H. E. ROSCOE  2,807,891
LIQUID REMOVAL APPARATUS
Filed Nov. 23, 1955
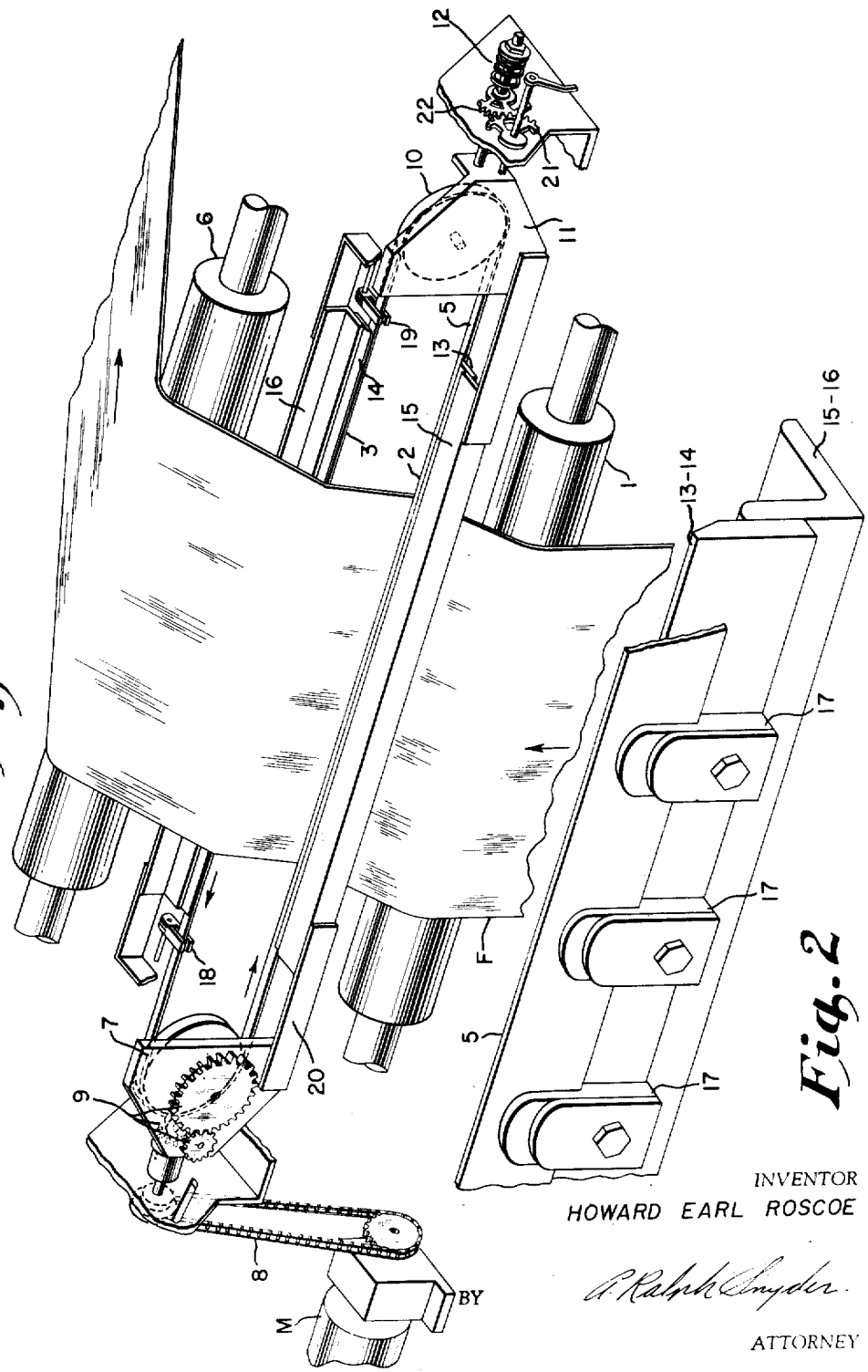
INVENTOR
HOWARD EARL ROSCOE
ATTORNEY

United States Patent Office 2,807,891
Patented Oct. 1, 1957

2,807,891

LIQUID REMOVAL APPARATUS

Howard Earl Roscoe, Camanche, Iowa, assignor to E. I. du Pont de Nemours and Company, Wilmington, Del., a corporation of Delaware Application November 23, 1955, Serial No. 548,720

4 Claims. (Cl. 34—95)

This invention relates to the manufacture of film and, more particularly, to an improved method and apparatus for removing excess liquid from a continuous gel regenerated cellulose film.

In the conventional manufacture of regenerated cellulose film, the gel film, after coagulation and regeneration, is led through numerous purification and wash tanks and finally into a tank which normally contains a softener and other materials which impart certain properties to the final dried film. After passage through this last tank, the film passes over a series of rotating heated dryer rolls and then, after the water content is reduced to the proper level, the film is wound up.

In order to reduce the dryer load and also to avoid the transfer of materials, such as resins, from the last tank to the dryer rolls, excess liquid must be removed from the film before it passes to the dryer. This is generally accomplished by the use of resilient squeeze rolls, stationary scraper blades or rods or air knives. Air knives are impractical because of the excessive amount of air required. Squeeze rolls have not been satisfactory because they do not remove enough of the excess liquid and, furthermore, the roll surfaces soon become worn and uneven and require frequent reconditioning. In addition, materials such as resins used in the last bath tend to build up and accumulate on the rolls. Stationary scraper blades or knives do a god job of uniformly removing excess liquid providing the scraping surface is in excellent condition and is free of non-uniformities and the accumulation of solid materials. It has been found, however, that stationary scraping devices do not maintain their original excellent condition and soon develop non-uniformities due either to wear, physical abuse, warpage or solids accumulation. These non-uniformities produce undesirable effects in the regenerated cellulose film such as moisture bands, poor sheet flatness, non-uniform distribution of modifying materials and poor appearance. When the scraping devices develop these irregularities, it becomes necessary to either clean off the scraping devices or to shut down the process to install new scrapers, both of which result in waste film and involve the expenditure of time and money.

The principal object of this invention, therefore, is to provide an improved process and means for the removal of excess liquid from a gel regenerated cellulose film which avoid the difficulties and disadvantages pointed out hereinabove. Another object is to remove excess liquid from a gel regenerated cellulose film by a device which maintains its effective action over a long period of time. Still another object is to provide a means for removing excess liquid from gel regenerated cellulose film which is characterized by uniformity in operation, and by simplicity, economy and a high degree of liquid-removing efficiency.

These objects are accomplished by the present invention which, briefly stated, comprises contacting each surface of a moving, continuous web containing an excessive amount of liquid, e. g., a web of regenerated cellulose film, with an edge of a continuously-moving, smooth, straight-edged, thin metal band moving in a straight line transverse to the direction of movement of the web, and continuously removing liquid from said band.

A preferred apparatus and arrangement thereof at the wet end of a conventional regenerated cellulose film-casting machine, in accordance with the principles of this invention, are shown in the drawings wherein:

Fig. 1 is a perspective view of an arrangement of apparatus in accordance with this invention; and Fig. 2 is a detailed, fragmentary view, in perspective, of the band and guide means therefor.

Referring to Fig. 1, a continuous film, F, of gel regenerated cellulose, issuing from the last tank of the wet end of a conventional casting machine (not shown), is passed over a freely-rotating roll 1, between and in contact with the exposed edges of the straight portions 2 and 3 of a driven, endless, flexible, metal band 5, and from dryer rolls of the casting machine.

The endless band 5 is driven by a pulley 7 suitably powered by a motor M connected to the pulley through roller chain 8, and a combination of gears indicated generally at 9. The band 5 is supported at the opposite side thence over roll 6 which guides the film directly to the of the machine by idler pulley 10 which is rotatably mounted on shiftable support 11 which in turn is urged by spring assembly 12 to maintain the band under tension. Band 5, for substantially its entire horizontal travel, rides in grooved supports formed by the rigid, solid strips 13 and 14, affixed to angular frame members 15 and 16, respectively, and a plurality of fingers 17 (Fig. 2) attached at intervals to the lower sides of strips 13 and 14 and each having a recessed portion at its upper end to provide a band-guiding and supporting groove between the finger and the strip to which it is attached. The grooved support lends rigidity to the band and prevents vibration.

The band, at each extremity of strip 14, passes between and in wiping contact with the replaceable blades of stationary cleaning stations or wipers 18 and 19, each comprised of hinged blades in wiping contact with the upper and lower surfaces of the band. Wipers at each end of the continuous band squeegee keep the band clean and free of foreign materials. These wipers may be made of any desired material, felt being quite satisfactory. When the wipers become dirty and do not clean the band effectively, it is a simple operation to install new wipers without any upset to the process. Preferably, the drive and idler pulleys, the band thereon, the wipers and the grooved supports are mounted on a frame 20 which is pivoted at each end to side frame members of the casting machine, and which is operable by quadrant gears 21 and 22 to rotate the scraping mechanism as a unit to an inoperative position to facilitate threading up the film at the beginning of the operation.

The endless metallic band may be made of any flexible, tough, corrosion-resistant metal, stainless steel being particularly suitable. The width of the band should not be less than ½" wide with one inch being approximately optimum.

The band should be thin relative to its width; however, the thickness of the band is critical only from the standpoint of ease of fabrication and the length of time it can be used without failure. For stainless steel bands, thickness ranges of 0.015–0.025 inch are practical. Bands thinner than 0.015 are difficult to weld whereas bands thicker than 0.025 inch have a short life.

The band should have true, near-sharp, straight edges which should be free of nicks and irregularities. If slight nicks and irregularities develop, however, after the band has been in use, the advantage of the moving band is that moisture bands and other irregularities produced in the sheet are more or less randomly distributed across the whole width of the sheet and therefore do not result in poorly wound rolls or in rolls in which the irregularities are concentrated in certain sections of the roll. The speed at which the band travels is not critical, except that an exceptionally fast speed would cause early fatigue and failure of the band. A speed of approximately 2 feet per minute has been found to give satisfactory results.

The grooved supports in which the band rides while in contact with the moving web of film may be constructed of any desired material having the necessary strength, rigidity and resistance to the action of water and chemicals. Nylon has been found especially suitable for this purpose. The use of a grooved support having a continuous solid surface above the band and spaced fingers (3" apart, for example) below the band facilitates venting away the excess liquid to allow it to follow the path of least resistance away from the web.

The apparatus of this invention is particularly effective for removing excess liquid from a gel regenerated cellulose film and may be used effectively with any film thickness and with any number of liquids which may be used in the tank preceding the dryer section of the machine. It is also effective for a wide range of film speeds. Furthermore, although the device has been found most useful in removing the excess liquid from the gel film prior to entering the dryer, the device is also useful at other locations in the process where transfer of a liquid from one tank to another by the film must be kept at a minimum.

When using stationary, bar-type squeegees, it has been necessary to clean the squeegees once per day with standard films, and three times per day when applying a resin in the softener bath, each time interfering with production. Using the continuous self-cleaning band squeegee of this invention, on the other hand, has made it possible to operate almost indefinitely without having to interfere with production for cleaning the squeegee. The felt pads in the cleaning devices are replaced occasionally on the "fly" without interrupting production. Moreover, the quality of film made with the continuous band squeegee was found to be equivalent or slightly better than the quality of film made with stationary, bar-type squeegees.

I claim:

1. Apparatus for continuously removing excess liquid from the surface of a moving, continuous web of film containing excess liquid, comprising in combination two aligned pulleys mounted on parallel, horizontal axes and spaced at a distance greater than the width of the web, an endless, thin, metal band mounted on said pulleys, means for driving one of said pulleys whereby the band is moved between said pulleys in an upper and lower path of travel, means for guiding the moving, continuous web of film first into contact with one edge of said band in its lower path of travel between said pulleys, and thence into contact with the opposite edge of said band in its upper path of travel between said pulleys, and means for wiping said moving band adjacent said pulleys.

2. The apparatus of claim 1 comprising, in addition, grooved, rigid guide means extending between said pulleys and arranged to guide and support the edges of said band not in contact with said web for substantially the entire distance between said pulleys.

3. The apparatus of claim 1 wherein said grooved guide means comprises a solid strip and a plurality of spaced fingers each attached at one end to the under surface of said strip and recessed at the opposite end to provide a band-receiving and supporting groove between said strip and said finger.

4. The apparatus of claim 1 wherein said wipers comprise two hinged blades arranged for wiping contact with the upper and lower surfaces respectively of said endless band.

References Cited in the file of this patent

UNITED STATES PATENTS

| | | |
|---|---|---|
| 1,284,202 | Richardson | July 26, 1913 |
| 1,487,375 | Fuchs | Apr. 12, 1922 |
| 1,607,417 | Wescott | Nov. 16, 1926 |
| 2,513,432 | Sisson | Aug. 14, 1945 |

UNITED STATES PATENT OFFICE

CERTIFICATE OF CORRECTION

Patent No. 2,807,891                     October 1, 1957

Howard Earl Roscoe

It is hereby certified that error appears in the printed specification of the above numbered patent requiring correction and that the said Letters Patent should read as corrected below.

Column 1, line 41, for "god" read -- good --; column 2, line 15, before "roll" insert -- guide --; line 23, strike out "thence over roll 6 which guides the film directly to the" and insert the same after "and from" in line 17, same column.

Signed and sealed this 26th day of November 1957.

(SEAL)
Attest:

KARL H. AXLINE
Attesting Officer

ROBERT C. WATSON
Commissioner of Patents